(12) United States Patent
Hewitt et al.

(10) Patent No.: US 7,396,882 B2
(45) Date of Patent: Jul. 8, 2008

(54) STYRENE-FREE UNSATURATED POLYESTER RESIN COMPOSITIONS

(75) Inventors: John C. Hewitt, Collierville, TN (US); John E. McAlvin, Collierville, TN (US); Paul Taylor Hutson, Memphis, TN (US); Amber E. Craig, Collierville, TN (US); Marjorie Krantz, Byhalia, MS (US); Derek K. Rivers, Memphis, TN (US)

(73) Assignee: AOC, LLC, Collierville, TN (US)

( * ) Notice: Subject to any disclaimer, the term of this patent is extended or adjusted under 35 U.S.C. 154(b) by 326 days.

(21) Appl. No.: 10/440,610

(22) Filed: May 19, 2003

(65) Prior Publication Data

US 2004/0010061 A1    Jan. 15, 2004

Related U.S. Application Data

(60) Provisional application No. 60/382,038, filed on May 20, 2002.

(51) Int. Cl.
*C07C 13/61* (2006.01)
*C08L 67/07* (2006.01)
*C08F 299/02* (2006.01)

(52) U.S. Cl. .......... 525/290; 525/75; 525/278; 525/445; 525/312; 525/263; 525/286; 525/193; 525/192; 525/207; 526/283; 526/290

(58) Field of Classification Search .......... 526/229, 526/317.1, 303.1, 283, 290; 525/290, 75, 525/278, 445, 312, 263, 286, 192, 193, 207
See application file for complete search history.

(56) References Cited

U.S. PATENT DOCUMENTS

| | | | |
|---|---|---|---|
| 4,390,662 A | 6/1983 | Ando et al. | |
| 4,777,209 A * | 10/1988 | Hefner, Jr. | 525/28 |
| 5,739,240 A | 4/1998 | Smith | |
| 5,747,597 A * | 5/1998 | Fujita et al. | 525/312 |
| 5,773,531 A | 6/1998 | Smith | |
| 5,908,875 A | 6/1999 | Smith | |
| 6,037,385 A | 3/2000 | Smith | |
| 6,277,939 B1 | 8/2001 | Smith | |
| 6,468,662 B1 * | 10/2002 | Nava | 428/430 |
| 6,646,057 B1 * | 11/2003 | Anders et al. | 525/278 |
| 6,808,821 B2 * | 10/2004 | Fujita et al. | 428/482 |
| 6,884,841 B2 * | 4/2005 | Nava | 525/44 |
| 6,992,140 B2 | 1/2006 | Kosono et al. | |

* cited by examiner

*Primary Examiner*—Randy Gulakowski
*Assistant Examiner*—Michael M Bernshteyn
(74) *Attorney, Agent, or Firm*—Baker Donelson Bearman Caldwell & Berkowitz PC

(57) ABSTRACT

Styrene-free unsaturated polyester resin compositions are provided which have low volatile organic compounds and hazardous air pollutants emissions when these resin compositions are used in open molding applications. A process for the manufacture of these resin compositions is provided.

22 Claims, No Drawings

US 7,396,882 B2

STYRENE-FREE UNSATURATED POLYESTER RESIN COMPOSITIONS

This application claims the benefit of U.S. Provisional Application Serial No. 60/382,038, filed May 20, 2002.

TECHNICAL FIELD

The present invention relates to polyester resin compositions. In a more specific aspect, this invention relates to styrene-free unsaturated polyester resin compositions.

BACKGROUND OF THE INVENTION

Thermoset resins, including unsaturated polyesters, are commonly employed in a variety of fabrications, such as casting materials, fiber reinforced materials and coatings. Unsaturated polyester resins may be defined as the condensation products of dicarboxylic acids or anhydrides with difunctional alcohols, typically dissolved in a reactive diluent such as styrene. Since the commercial inception of unsaturated polyester resins, styrene has been a primary reactive diluent due to its low cost, availability, ease of use and resulting excellent mechanical properties. However, in recent years, government regulations have restricted styrene emissions in open molding facilities due to harmful environmental and health effects.

A number of alternatives has been sought to reduce emissions and as substitutes for styrene. Higher molecular weight derivatives of styrene, such as vinyl toluene and t-butyl styrene, have been utilized as reactive diluents and resulted in decreased emissions. However, emissions are still significant in these resins, and such alternative styrene analogs are volatile organic compounds. The addition of paraffins to unsaturated polyester resins has been shown to reduce emissions by forming a thin film on the resin surface. While suitable for some applications, this solution is unacceptable for other applications due to a decreased interlaminate adhesion.

In most cases, low volatile acrylate and methacrylate monomers have been inadequate as replacements for styrene in unsaturated polyester resins since atmospheric oxygen severely retards polymerization, resulting in an under-cured "tacky" surface. Furthermore, the poor copolymerization of most acrylates and methacrylates with maleate and fumarate moieties in the polyester backbone often results in inferior mechanical properties compared to styrenated unsaturated polyester resins.

In this application, the term (meth)acrylate will be understood to include both acrylate and methacrylate compounds.

Previous patents have described non-styrenated unsaturated polyester resin compositions.

U.S. Pat. No. 5,747,597 describes a curable resin comprised of an unsaturated polyester, epoxymethacrylate and/or urethane methacrylate, combined with oligoalkyl ether-monoalkoxy methacrylates. The resin was described in many cases to air dry "dry-to-touch" after the addition of wax, free-radical initiator, catalyst and exposure to elevated temperatures (130-145° F.). Tensile testing of the cast resin revealed high elongation and low strength properties, which is in sharp contrast to data using the same polymers dissolved in styrene that demonstrated considerably higher tensile strengths.

International Patent Publication No. WO 99/23122 describes the use of hydroxyethyl methyl methacrylate, hydroxyethyl propyl methacrylate and/or urethane hydroxyethyl methacrylate with polyesters and vinyl esters. The resulting tensile and flexural properties of the cured products were comparable to styrenated unsaturated polyester resins, but tack-free cure in thin films and thin laminates tends to be a problem with these resins. Additionally, based on our evaluation, the storage stability of resins described in this publication is very poor.

Additional U.S. patents which describe non-styrenated unsaturated polyester resin compositions are U.S. Pat. No. 5,908,875, U.S. Pat. No. 5,739,240, U.S. Pat. No. 6,277,939, U.S. Pat. No. 5,773,531 and U.S. Pat. No. 6,037,385.

An ongoing goal in the unsaturated polyester industry has been to develop improved non-styrenated, free-radical curable resins which have processing similar to current styrenated resins, benefits in mechanical and physical properties and tack-free cure in thin films.

SUMMARY OF THE INVENTION

Briefly described, the present invention provides styrene-free unsaturated polyester resin compositions which have low emissions from VOC or hazardous air pollutants (HAP) when these resin compositions are used in open molding applications.

The resin compositions of this invention exhibit mechanical properties comparable to styrene-containing unsaturated polyester resin compositions and also exhibit efficient cure in a thin laminate under an air atmosphere at ambient temperatures.

Accordingly, an object of this invention is to provide unsaturated polyester resin compositions.

Another object of this invention is to provide styrene-free unsaturated polyester resin compositions.

Another object of this invention is to provide styrene-free unsaturated polyester resin compositions which have low VOC and HAP emissions when used in open molding applications.

These and other objects, features and advantages of this invention will become apparent from the following detailed description.

DETAILED DESCRIPTION OF THE INVENTION

The present invention provides new and unique styrene-free unsaturated polyester resin compositions which comprise (1) a dicyclopentadiene-based unsaturated polyester; (2) a urethane (meth)acrylate; (3) a multifunctional (meth)acrylate monomer; and (4) a hydroxyl-functionalized (meth)acrylate monomer.

The procedure for the preparation of the dicyclopentadiene-based unsaturated polyester component of this invention is well known to those skilled in the art. Dicyclopentadiene may be utilized to prepare unsaturated polyesters by two methods. The most common method is the end-capping approach where dicyclopentadiene is reacted with a carboxylic acid. The second method is formation of a nadic-type polymer where dicyclopentadiene is converted to cyclopentadiene which subsequently reacts with available carbon-carbon double bonds in the polymer chain by way of a Diels Alder reaction.

Typically, these unsaturated polyesters are the product of maleic acid, fumaric acid, orthophthalic acid or the corresponding anhydrides, including combinations thereof, with dicyclopentadiene (DCPD) and any number of multifunctional alcohols such as ethylene glycol, diethylene glycol, propylene glycol, 2-methyl-1,3-propanediol, dipropylene glycol, neopentyl glycol, butanediol, butyl ethyl propanediol, trimethylol propane, glycerol, pentaerythritol and related compounds including polymeric analogs. Less commonly used in conjunction with dicyclopentadiene are isophthalic acid, terephthalic acid, hexahydrophthalic acid, itaconic acid, tetrahydrophthalic acid, trimellitic acid, cyclohexane dicarboxylic acid, adipic acid, succinic acid and their corresponding anhydride derivatives.

In most cases, the unsaturation in polyesters reactivity towards free-radical polymerization is confined to maleate and fumarate moieties in the polymer backbone. The addition of unsaturation at the polymer chain end to polymerize with the reactive diluent results in enhanced mechanical and physical properties.

The unsaturated dicyclopentadiend-based polyester used in this invention may not only be one described by the aforementioned composition of diacids, anhydrides and dialcohols, but also optionally may be modified with glycidyl methacrylate. Similarly, allyglycidylether may be used to introduce allyl ether functionality at the polymer chain end. Other compounds to introduce allyl ether functionalities to the polymer chain include trimethylolpropane diallyl ether, allyl pentaerythritol and related derivatives. The preferred concentration of dicyclopentadiene-containing polyester in the present invention is about 15-70% by weight.

The urethane (meth)acrylate component of the resin of this invention is a product of a difunctional or polyfunctional isocyanate with a hydroxyl-functionalized (meth)acrylate. The preparation of urethane (meth)acrylates is well known to those skilled in the art. Isocyantes that may be employed in this invention include 2,4-toluene diisocyanate, 2,6-toluene diisocyanate (TDI), 4,4'-diphenylmethane diisocyanate (MDI), 1,5-naphthalene diisocyanate (NDI), tetramethylxylene diisocyanate (TMXDI), hexamethylene diisocyanate (HDI), 4,4'-dicylohexylmethane diisocyanate ($H_{12}MDI$), 4,6'-xylene diisocyanate (XDI), isophorone isocyanate (IPDI), 2,2,4-trimethyl-1,6-hexamethylene diisocyanate (TMDI), paraphylene diisocyanate (PPDI), cyclohexyldiisocyanate (CHDI), 3,3'-tolidene 4,4'-diisocyanate (TODI) and 3,3'-dimethyl-diphenylmethane 4,4'-diisocyanate (DDI), including their polymeric forms. Prior to reaction with hydroxy-functionalized (meth)acrylates, these isocyantes may optionally be "chain extended" by reaction with any of the aforementioned multifunctional alcohols.

Hydroxy-functionalized (meth)acrylates that may be used in the preparation of the urethane (meth)acrylate monomer component or as a monomeric reactive diluent of this invention include hydroxyethyl methacrylate (HEMA), hydroxypropyl methacrylate (HPMA), hydroxyethyl acrylate (HEA), hydroxypropyl acrylate (HPA) and related compounds.

The preferred concentration of the urethane (meth)acrylate in the present invention is about 15-70% by weight. The preferred concentration of monomeric reactive diluent hydroxyl-functionalized (meth)acrylate in the present invention is about 5-60% by weight.

Multifunctional (meth)acrylate monomers that may be used in the resin compositions of this invention are 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycoldiacrylate, ethoxylated bisphenol A diacrylate, trimethylolpropane triacrylate, pentaerythritol triacrylate, pentaerythritol tetraacrylate and their related (meth)acrylate derivatives. The preferred concentration of multifunctional (meth)acrylate in the present invention is about 5-60% by weight.

The resin composition of this invention may be cured by a number of free-radical initiators, including peroxide and azo-type initiators. Peroxide initiators include diacylperoxides, hydroperoxides, ketone peroxides, peroxyesters, peroxyketals, dialkyl peroxides, alkyl peresters and percarbonates. Examples of these peroxides include methyl ethyl ketone peroxide (MEKP), benzoyl peroxide (BPO) and cumene hydroperoxide (CHP). Combinations of two or more peroxides may be used to cure the resin. Azo-type initiators include azobisisobutyronitrile (AIBN) and related compounds. These initiators are preferably used in the range of about 1-3 percent by weight. These resins may also be cured by irradiation with ultraviolet light or electron beam.

Metal carboxylates, such as cobalt napthenate and cobalt octoate, may be employed to catalyze the free-radical reaction. Zinc, iron, vanadium, potassium and other metal complexes may also be used for this process. These compounds or combinations thereof may be added at levels of up to about 1 percent by weight.

Nitrogen-containing compounds, such as derivatives of aniline, various amides, aromatic and aliphatic amines, may be used to enhance the cure. If used, nitrogen-containing compounds or combinations thereof are usually added at levels of no more than about 1 percent by weight.

Inhibitors such as hydroquinone, parabenzoquinone, 4-tert butycatechol and their related derivatives may be added to increase shelf stability and adjust gel time. Such compounds are added to the resin composition at levels of about 0.0005-1.0 percent by weight.

A number of additional additives may be utilized in the current invention including fillers, thixotropic agents, viscosity modifiers, density modifiers, pigments and dyes, and waxes or hydrocarbons. Fillers may be used at levels up to about 60 percent by weight and include calcium carbonate, calcium sulfate, aluminum trihydrate or any combination thereof. Thixotropic agents such as fumed silica or organoclays may be used at levels up to about 5 percent by weight. Microballoons or microspheres may be used at levels up to about 5 percent by weight to reduce the density. Pigments or dyes may be used in the resin at levels up to about 5 percent by weight. Barrier forming agents such as paraffins, polyethers, polysiloxanes and other polymers may be used in the present invention up to about 2 percent by weight to minimize air inhibition and decrease surface tack.

The present invention is further illustrated by the following examples which are illustrative of certain embodiments designed to teach those of ordinary skill in the art how to practice the invention and to represent the best mode contemplated for practicing the invention.

In the following examples, the term "parts" indicates parts by weight. Several of the examples were evaluated for their cure under air atmosphere at ambient temperature in a two ounce chopped strand mat laminate cured with 2% MEKP (methyl ethyl ketone peroxide). Resins were also evaluated as ⅛-inch clear cast samples for mechanical properties, which were cured with 1.25% MEKP, followed by a post cure for five hours at 100° C. Several resins were compared for emissions after addition of catalyst and initiator. The tests demonstrated reduced weight loss for the resin compositions of this invention compared to a styrenated unsaturated polyester resin and an unsaturated polyester dissolved in vinyl toluene. All of the following examples of the resin compositions of this invention demonstrated excellent shelf stability in accelerated testing (>530 days at 50° C.) without gel formation.

EXAMPLE 1

A reaction vessel charged with 362 parts dicyclopentadiene, 0.08 parts hydroquinone and 52 parts of water was heated to 80° C. under an atmosphere of nitrogen. Maleic anhydride (256 parts) was added to the vessel, and the mixture was heater at 140° C. for one hour before addition of 39 parts of ethylene glycol and 91 parts of diethylene glycol. The mixture was mechanically stirred at 215° C. until an acid value of 25 was obtained and the liquid polymer was delivered to 1,6-hexanediol diacrylate, bringing the solids level to 80%. Tert-butyl catechol, monotert-butyl hydroquinone and 1,4-naphthoquinone were added to the mixture at 50 ppm, 80 ppm and 100 ppm, respectively. This resin solution was used to make blends in Examples 5 and 6, which were subsequently evaluated and summarized in Table 1.

EXAMPLE 2

A reaction vessel charged with 362 parts dicyclopentadiene, 0.08 parts hydroquinone, and 52 parts of water was heated to 80° C. under an atmosphere of nitrogen. Maleic anhydride (256 parts) was added to the vessel and the mixture was heated at 140° C. for one hour before addition of 39 parts of ethylene glycol and 91 parts of diethylene glycol. The mixture was mechanically stirred at 215° C. until an acid value of 25 was obtained and the liquid polymer was delivered to 2-hydroxyethyl methacrylate bringing the solids level to 73%. Toluhydroquinone, emthyle ether hydroquinone, parabenzoquinone, and copper naphthenate were added to the solution to 50 ppm, 50 ppm, 15 ppm, and 10 ppm, respectively. This resin solution was used to make blends in Examples 7-9, which were subsequently evaluated and summarized in Table 1.

EXAMPLE 3

A reaction vessel charged with 173 parts dicyclopentadiene, 0.04 parts hydroquinone, and 25 parts of water was heated to 80° C. under an atmosphere of nitrogen. Maleic anhydride (123 parts) was added to the vessel and the mixture was heated at 140° C. for one hour before addition of 19 parts of ethylene glycol and 25 parts of diethylene glycol. The mixture was mechanically stirred at 215° C. until an acid value of 50 was obtained at which point the temperature was decreased to 130° C. and an air sparge began. Butyl hydroxy toluene (0.2 parts), N,N-dimethyl benzylamine (0.4 parts) and 36 parts glycidyl methacrylate were added and the mixture stirred for 30 minutes. The liquid polymer was delivered to 1,6-hexanediol diacrylate bringing the solids content to 80%. Toluhydroquinone and para-benzoquinone were added to the resin solution at 100 ppm and 15 ppm, respectively. This resin solution was used to make blends in Examples 10-13, which were subsequently evaluated and summarized in Table 2.

EXAMPLE 4

1,6-Hexanediol diacrylate (140 parts), hydroxypropyl methacrylate (142 parts), para-benzoquinone (0.04 parts), butyl hydroxy toluene (0.2 parts), and 0.4 parts dibutyl tin dilaurate were charged to a reaction vessel. While sparging with air, a mixture of polymeric and pure 4,4'-diphenylmethane diisocyanate (118 parts) was slowly added. The mixture reached a temperature of 80° C. due to exotherm and was allowed to drift back to ambient temperature and stirred until the isocyanate content reached less than 0.3% by titration, at which time 0.02 parts hydroquinone was added. This product was used to make blends in several subsequent examples that are evaluated in Tables 1 and 2. Analysis by IR spectroscopy, $^1$H NMR and $^{13}$C NMR confirmed the presence of the desired product.

EXAMPLE 5

A mixture of 416 parts of the unsaturated polyester resin described in Example 1 was combined with 321 parts of the urethane methacrylate solution of Example 4 and 263 parts of 1,6-hexanediol diacrylate. The mixture was evaluated and summarized in Table 1. Notable of this example is that HDDA, the only reactive diluent, results in a resin with a good heat distortion temperature and a high elongation, but has flexural and tensile strength and modulus values below that of the styrenated resin (Table 3, Example 14). It is evident after comparison to Example 15 (Table 3), the increased heat distortion temperature is partially contributed by the presence of the urethane methacrylate. Surface cure in the resin was very poor. The cured resin in a 2 oz. laminate was still tacky after 24 hours, indicating inefficient cure due to air inhibition.

EXAMPLE 6

A mixture of 454 parts of the unsaturated polyester resin described in Example 1 was combined with 350 parts of the urethane methacrylate solution of Example 4 and 196 parts of 2-hydroxyethyl methacrylate. The mixture, which contains all four of the essential components of the resin composition of this invention, was evaluated and summarized in Table 1. Surprisingly, this cured composition resulted in high tensile and flexural values (both modulus and strength) and far exceeded the values of those examples lacking an essential component (Examples 5 and 7). Flexural and tensile strengths exceed the styrenated resin (Example 14, Table 3), and the modulus values are nearly comparable, as is the heat distortion temperature. The incorporation of HEMA greatly improved the surface cure of the resin, compared to Example 5. The surface of the 2 oz laminate became tack free after 2 hours. Thicker laminates became tack free in one hour. This example demonstrated significantly lower emissions (Table 4; calculated by weight loss) than the styrenated resin (Example 14) and the resin containing vinyl toluene (Example 17).

EXAMPLE 7

A mixture of 753 parts of the unsaturated polyester resin described in Example 2 was combined with 247 parts of 2-hydroxyethyl methacrylate. The mixture was evaluated and summarized in Table 1. The cured resin in this system resulted in very low elongation and strength values. Flexural and tensile modulus values are similar to Example 5 and are also below the values obtained with the styrenated analog (Table 3, Example 14). The liquid solution exhibited very poor shelf stability, due to the highly reactive HEMA. The lack of HDDA and the urethane methacrylate contributed to the low heat distortion temperature.

EXAMPLE 8

A mixture of 481 parts of the unsaturated polyester resin described in Example 2 was combined with 305 parts of the urethane methacrylate solution of Example 4 and 214 parts of 2-hydroxyethyl methacrylate. The mixture was evaluated and summarized in Table 1. While the combination of tensile and flexural properties offer the highest values this example containing the four essential components, the heat distortion temperature is lower than Example 6, due to lower levels of HDDA, which is only provided in the diluent of the urethane methacrylate.

EXAMPLE 9

A mixture of 754 parts of the unsaturated polyester resin described in Example 2 was combined with 224 parts of 1,6-hexanediol diacrylate and 22 parts of 2-hydroxyethyl methacrylate. The mixture was evaluated and summarized in Table 1. Similar to Example 7, the absence of the urethane methacrylate component resulted in poor heat distortion temperature.

EXAMPLE 10

A mixture of 273 parts of the unsaturated polyester resin described in Example 3 was combined with 210 parts of the urethane methacrylate solution of Example 4 and 117 parts of 2-hydroxyethyl methacrylate. The resin was evaluated and summarized in Table 2. The clear cast resin exhibited a combination of good heat distortion temperature, tensile and flexural properties. In addition, resin cured dry-to-touch within 2 hours in the 2 oz. laminate.

EXAMPLE 11

A mixture of 360 parts of the unsaturated polyester resin described in Example 3 was combined with 120 parts of the urethane methacrylate solution of Example 4 and 120 parts of 2-hydroxyethyl methacrylate. The mixture was evaluated and summarized in Table 2. Similar to Example 10, but at a higher solids content and less urethane methacrylate, this resin exhibited higher flexural and tensile properties than other VOC-free resins that did not contain all four essential components. The decreased urethane methacrylate content resulted in a slightly lower heat distortion temperature relative to Example 10.

EXAMPLE 12

A mixture of 450 parts of the unsaturated polyester resin described in Example 3 was combined with 150 parts of 2-hydroxyethyl methacrylate. The mixture was evaluated and summarized in Table 2. Lacking the urethane methacrylate component, the cast resin exhibited a low heat distortion temperature, but surprisingly high tensile and flexural properties. The 2 oz. laminate cured in less than 2 hours due to the high 2-hydroxyethyl methacrylate content.

EXAMPLE 13

A mixture of 250 parts of the unsaturated polyester resin described in Example 3 was combined with 193 parts of the urethane methacrylate solution of Example 4 and 158 parts of 1,6-hexanediol diacrylate. The mixture was evaluated and summarized in Table 2. The cure of the 2 oz. laminate eventually cured tack free, but only after an extended period of time (18 h). This is in contrast to Example 16, which did not demonstrate complete cure within 24 hours due to the lack of urethane methacrylate. The cast resin exhibited a relatively high heat distortion temperature, but low tensile strength and elongation.

EXAMPLE 14

A reaction vessel charged with 362 parts dicyclopentadiene, 0.08 parts hydroquinone and 52 parts of water was heated to 80° C. under an atmosphere of nitrogen. Maleic anhydride (256 parts) was added to the vessel, and the mixture was heated at 140° C. for one hour before addition of 39 parts of ethylene glycol and 91 parts of diethylene glycol. The mixture was mechanically stirred at 215° C. until an acid value of 25 was obtained and the liquid polymer was delivered to styrene, bringing the solids content to 65%. Tert-butyl catechol, monotert-butyl hydroquinone, and 1,4-naphthoquinone were added to the mixture at 50 ppm, 80 ppm, and 100 ppm, respectively. The resin was evaluated for comparative purposes and summarized in Tables 3 and 4.

EXAMPLE 15

A reaction vessel charged with 362 parts dicyclopentadiene, 0.08 parts hydroquinone, and 52 parts of water was heated to 80° C. under an atmosphere of nitrogen. Maleic anhydride (256 parts) was added to the vessel, and the mixture was heated at 140° C. for one hour before addition of 39 parts of ethylene glycol and 91 parts of diethylene glycol. The mixture was mechanically stirred at 215° C. until an acid value of 25 was obtained and the liquid polymer was delivered to 1,6-hexanediol diacrylate, bringing the solids content to 55%. Tert-butyl catechol, monotert-butyl hydroquinone, and 1,4-naphthoquinone were added to the mixture at 50 ppm, 80 ppm, and 100 ppm, respectively. The resin was evaluated for comparative purposes and summarized in Table 3. Mechanical analysis of the cured resin revealed poor overall physical properties and a low heat distortion temperature. As expected, the highly air inhibited resin failed to cure completely in the thin laminate within 24 hours.

EXAMPLE 16

A reaction vessel charged with 173 parts dicyclopentadiene, 0.04 parts hydroquinone, and 25 parts of water was heated to 80° C. under an atmosphere of nitrogen. Maleic anhydride (123 parts) was added to the vessel, and the mixture was heated at 140° C. for one hour before addition of 19 parts of ethylene glycol and 25 parts of diethylene glycol. The mixture was mechanically stirred at 215° C. until an acid value of 50 was obtained at which point the temperature was decreased to 130° C. and an air sparge began. Butyl hydroxy toluene (0.2 parts), N,N-dimethyl benzylamine (0.4 parts), and 36 parts glycidyl methacrylate were added and the mixture stirred for 30 minutes. The liquid polymer was delivered to 1,6-hexanediol diacrylate, bringing the solids content to 70%. Toluhydroquinone and para-benzoquinone were added to the resin solution at 100 ppm and 15 ppm, respectively. The resin was evaluated for comparative purposes and summarized in Table 3. The glycidyl methacrylate may have contributed to higher heat distortion temperature compared to Example 15, but still overall properties were inferior compared to the styrenated product (Example 14).

EXAMPLE 17

A reaction vessel charged with 362 parts dicyclopentadiene, 0.08 parts hydroquinone, and 52 parts of water was heated to 80° C. under an atmosphere of nitrogen. Maleic anhydride (256 parts) was added to the vessel, and the mixture was heated at 140° C. for one hour before addition of 39 parts of ethylene glycol and 91 parts of diethylene glycol. The mixture was mechanically stirred at 215° C. until an acid value of 25 was obtained and the liquid polymer was delivered to vinyl toluene, bringing the solids content to 65%. Tert-butyl catechol, monotert-butyl hydroquinone, and 1,4-naphthoquinone were added to the mixture to bring concentrations 50 ppm, 80 ppm, and 100 ppm, respectively. The resin was evaluated for comparison of emissions after catalysis and initiation. Results are summarized in Table 4 and demonstrate significantly higher emissions for Example 17 compared to an example of this invention (Example 6).

EXAMPLE 18

Trimethylolpropane triacrylate (140 parts), hydroxypropyl methacrylate (147 parts), para-benzoquinone (0.04 parts), butyl hydroxy toluene (0.2 parts), and 0.4 parts dibutyl tin dilaurate were charged to a reaction vessel. While sparging with air, a mixture of polymeric and pure 4,4'-diphenylmethane diisocyanate (113 parts) was slowly added. The mixture reached a temperature of 80° C. due to exotherm and was allowed to drift back to ambient temperature and stirred until the isocyanate content reached less than 0.3% by titration, at which time 0.02 parts hydroquinone was added. This product was used to make Example 20 that are evaluated in Table 3. Analysis by IR spectroscopy, $^1$H NMR and $^{13}$C NMR confirmed the presence of the desired product.

EXAMPLE 19

A reaction vessel charged with 362 parts dicyclopentadiene, 0.08 parts hydroquinone, and 52 parts of water was heated to 80° C. under an atmosphere of nitrogen. Maleic anhydride (256 parts) was added to the vessel and it was heated at 140° C. for one hour before addition of 39 parts of ethylene glycol and 91 parts of diethylene glycol. The mixture was mechanically stirred at 215° C. until an acid value of 25 was obtained and the liquid polymer was delivered to trimethylolpropane triacrylate, bringing the solids content to 80%. Tert-butyl catechol, monotert-butyl hydroquinone, and 1,4-naphthoquinone were added to the mixture to bring concentrations 50 ppm, 80 ppm, and 100 ppm, respectively. This product was used to make Example 20 that is evaluated in Table 3.

EXAMPLE 20

A mixture of 39 parts of the unsaturated polyester resin described in example 19 was combined with 30 parts of the urethane methacrylate solution of example 18, 7 parts of trimethylolpropane triacrylate, and 24 parts of 2-hydroxyethyl methacrylate. The mixture, which contains all four of the essential components, was evaluated and summarized in Table 3. Evaluation of the mechanical properties in Table 3 revealed a high heat distortion temperature along with a high flexural strength. In addition, the resin cured well in a thin laminate.

TABLE 1

| Property | ASTM Method | Units | Example 5 | Example 6 | Example 7 | Example 8 | Example 9 |
|---|---|---|---|---|---|---|---|
| Flexural Strength | D-790 | psi | 13,904 | 18,093 | 8,477 | 18,914 | 16,892 |
| Flexural Modulus | D-790 | psi | 440,000 | 520,000 | 440,000 | 540,000 | 460,000 |
| Tensile Strength | D-638 | psi | 8,315 | 10,208 | 3,890 | 11,960 | 10,420 |
| Tensile Modulus | D-638 | psi | 350,000 | 480,000 | 420,000 | 540,000 | 460,000 |
| Tensile Elongation | D-638 | % | 3.4 | 3.2 | 1.1 | 3.6 | 4.6 |
| Heat Distortion Temperature | D-648 | ° C. | 97 | 84 | 50 | 78 | 67 |
| Barcol | D-2583 | 934-1 | 41 | 44 | 34 | 44 | 40 |
| 2 oz laminate air dry[a] | | +/0/− | − | + | + | + | + |

Properties of the cast resins of Examples 5-9. [a] + indicates dry within 2 hr, 0 indicates dry within 24 hr, − indicates does not dry in 24 hr.

TABLE 2

| Property | ASTM Method | Units | Example 10 | Example 11 | Example 12 | Example 13 |
|---|---|---|---|---|---|---|
| Flexural Strength | D-790 | psi | 18,730 | 18,642 | 18,788 | 16,862 |
| Flexural Modulus | D-790 | psi | 510,000 | 510,000 | 510,000 | 430,000 |
| Tensile Strength | D-638 | psi | 10,849 | 10,508 | 10,179 | 6,305 |
| Tensile Modulus | D-638 | psi | 490,000 | 510,000 | 490,000 | 400,000 |
| Tensile Elongation | D-638 | % | 3.0 | 2.8 | 2.6 | 1.9 |
| Heat Distortion Temperature | D-648 | ° C. | 86 | 76 | 65 | 88 |
| Barcol | D-2583 | 934-1 | 42 | 43 | 41 | 40 |
| 2 oz laminate air dry [a] | | +/0/− | + | + | + | 0 |

Properties of the cast resins of Examples 10-13. [a] + indicates dry within 2 hr, 0 indicates dry within 24 hr, − indicates does not dry in 24 hr.

TABLE 3

| Property | ASTM Method | Units | Example 14 | Example 15 | Example 16 | Example 20 |
|---|---|---|---|---|---|---|
| Flexural Strength | D-790 | psi | 14,000 | 12,112 | 13,657 | 17,738 |
| Flexural Modulus | D-790 | psi | 590,000 | 360,000 | 420,000 | 590,000 |
| Tensile Strength | D-638 | psi | 9,000 | 6,581 | 5,994 | 9,123 |
| Tensile Modulus | D-638 | psi | 570,000 | 400,000 | 330,000 | 540,000 |

TABLE 3-continued

| Property | ASTM Method | Units | Example 14 | Example 15 | Example 16 | Example 20 |
|---|---|---|---|---|---|---|
| Tensile Elongation | D-638 | % | 2.0 | 2.8 | 2.1 | 2.1 |
| Heat Distortion Temperature | D-648 | °C. | 95 | 65 | 82 | 95 |
| Barcol | D-2583 | 934-1 | 42 | 38 | 42 | 49 |
| 2 oz laminate air dry[a] | | +/0/− | + | − | − | + |

Properties of the cast resins of Examples 14-16 and 20. [a] + indicates dry within 2 hr, 0 indicates dry within 24 hr, − indicates does not dry in 24 hr.

TABLE 4

Comparison of catalyzed resin emissions: An example of this invention (Example 6); a standard low HAP DCPD-based unsaturated polyester in styrene (Example 14); and an ultra low-HAP DCPD-based unsaturated polyester in vinyl toluene (Example 14). The tests were performed with 6.30 g of resin in an aluminum dish (58 mm diameter × 18 mm depth), catalyzed and initiated with 0.2% Co Octoate 12 percent (available from OMG), 0.05% Cobalt carboxylate 21 percent (available from Shepherd Chemical as Cobalt 21), 0.05% dimethyl aniline, 0.05% dimethyl acetoacetamide, and 1.25% MEKP-925. Following addition of catalysts and peroxides, specimens were measured for weight loss at designated times shown above. All specimens cured during the test.

| Resin | Description | Percent weight HAP monomer in uncured resin | Percent weight loss after 4 h at 25° C. | Percent weight Loss after 4 h at 25° C. and 1 h at 110° C. |
|---|---|---|---|---|
| Example 6 | DCPD-based unsaturated polyester in HDDA, HEMA and a urethane methacrylate | 0 | 0.10 | 0.10 |
| Example 14 | DCPD-based unsaturated polyester in styrene | 35 | 2.70 | 2.70 |
| Example 17 | DCPD-based unsaturated polyester in vinyl toluene | 0 | 1.91 | 2.07 |

This invention has been described in detail with particular reference to certain embodiments, but variations and modifications can be made without departing from the spirit and scope of the invention.

What is claimed is:

1. A styrene-free unsaturated polyester resin composition consisting essentially of (1) a dicyclopentadiene-based unsaturated polyester; (2) a urethane (meth)acrylate; (3) a multifunctional (meth)acrylate monomer and (4) from 5-60 percent by weight of a hydroxyl-functionalized (meth)acrylate monomer, wherein the resin composition after cure has a heat distortion temperature (ASTM D-648) of at least 65° C.

2. A resin composition as defined by claim 1 wherein the concentration of the unsaturated polyester is from 15-70 percent by weight.

3. A resin composition as defined by claim 1 wherein the unsaturated polyester has a weight average molecular weight of 800-10,000.

4. A resin composition as defined by claim 1 wherein the unsaturated polyester is the reaction product of dicyclopentadiene with compounds of carboxylic acids and/or anhydrides and alcohols.

5. A resin composition as defined by claim 1 wherein the unsaturated polyester is modified with glycidyl methacrylate at a level up to about 20 percent by weight of the unsaturated polyester.

6. A resin composition as defined by claim 1 wherein the unsaturated polyester is modified with an allyl ether functionalized alcohol or epoxy at a level up to about 20 percent by weight of the unsaturated polyester.

7. A resin composition as defined by claim 1 wherein the concentration of the urethane (meth)acrylate is from 15-70 percent by weight.

8. A resin composition as defined by claim 1 wherein the urethane (meth)acrylate is a reaction product of a hydroxyl-functionalized (meth)acrylate with a diisocyanate or polyisocyanate.

9. A resin composition as defined by claim 1 wherein the concentration of the multifunctional (meth)acrylate is from 5-60 percent by weight.

10. A resin composition as defined by claim 1 that contains up to about 60 percent by weight of a filler.

11. A resin composition as defined by claim 10 wherein the filler is calcium carbonate, calcium sulfate, aluminum trihydrate, clay or a combination thereof.

12. A resin composition as defined by claim 1 that contains up to about 5 percent by weight of a thixotropic agent.

13. A resin composition as defined by claim 12 wherein the thixotropic agent is fumed silica, organoclays or a combination thereof.

14. A resin composition as defined by claim 1 that contains up to about 2 percent by weight of a barrier forming agent.

15. A resin composition as defined by claim 1 that is cured with 1-3 percent by weight of a diacylperoxide, hydroperoxide, ketone peroxide, peroxyester, peroxyketal, dialkyl peroxide, alkyl perester, percarbonate, azo compound or a combination thereof.

16. A resin composition as defined by claim 1 that is formulated with a derivative of aniline, an amide, an aromatic amine or an aliphatic amine at a level up to about 1 percent by weight.

17. A resin composition as defined by claim 1 that is formulated with a cobalt carboxylate, vanadium, potassium, zinc or iron compound at a level up to about 1 percent by weight.

18. A resin composition as defined by claim 1 that after cure has a tensile strength (ASTM D-638) and tensile modulus (ASTM D-638) of at least 7,000 psi and 350,000 psi, respectively.

19. A resin composition as defined by claim 1 that after cure has a flexural strength (ASTM D-790) and flexural modulus (ASTM D-790) of at least 10,000 psi and 350,000 psi, respectively.

20. A resin composition as defined by claim 1 that contains at least two multifunctional (meth)acrylate monomers.

21. A resin composition as defined by claim 1 that contains at least two hydroxyl-functionalized (meth)acrylate monomers.

22. A resin composition as defined by claim 14 wherein the barrier forming agent is a paraffin, polyester, polysiloxane or a combination thereof.

* * * * *